US012600257B2

(12) United States Patent
Terada

(10) Patent No.: US 12,600,257 B2
(45) Date of Patent: Apr. 14, 2026

(54) CHARGER MANAGEMENT DEVICE AND CHARGING CONTROL DEVICE

(71) Applicant: MERCEDES-BENZ GROUP AG, Stuttgart (DE)

(72) Inventor: Ichiro Terada, Tokyo (JP)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/871,857

(22) PCT Filed: Dec. 14, 2023

(86) PCT No.: PCT/JP2023/044872
§ 371 (c)(1),
(2) Date: Dec. 5, 2024

(87) PCT Pub. No.: WO2024/128286
PCT Pub. Date: Jun. 20, 2024

(65) Prior Publication Data
US 2025/0170920 A1 May 29, 2025

(30) Foreign Application Priority Data
Dec. 15, 2022 (JP) ................................. 2022-200159

(51) Int. Cl.
*B60L 53/66* (2019.01)
*B60L 53/62* (2019.01)
(Continued)

(52) U.S. Cl.
CPC .............. *B60L 53/66* (2019.02); *B60L 53/62* (2019.02); *B60L 53/65* (2019.02); *B60L 53/68* (2019.02);
(Continued)

(58) Field of Classification Search
CPC .......... B60L 53/66; B60L 53/62; B60L 53/65; B60L 53/68; H02J 7/00045
See application file for complete search history.

(56) References Cited

U.S. PATENT DOCUMENTS 11,241,972 B2     2/2022  Niwa et al.
2012/0109519 A1*  5/2012  Uyeki ..................... B60L 53/68
                                                     701/426
(Continued)

FOREIGN PATENT DOCUMENTS

CN        104661855 A        5/2015
CN        110077269 A        8/2019
(Continued)

OTHER PUBLICATIONS

International Search Report and Written Opinion mailed Feb. 27, 2024 in related/corresponding International Application No. PCT/JP2023/044872.
(Continued)

*Primary Examiner* — David V Henze

(74) *Attorney, Agent, or Firm* — PATENT PORTFOLIO BUILDERS PLLC

(57) ABSTRACT

A charger management server manages compatibility between an external charger and a vehicle. The server includes an information acquisition unit that acquires charging status information on a status acquired when the external charger and the vehicle are connected to conduct charging, and a compatibility information generation unit that generates compatibility information on compatibility between the external charger and the vehicle based on the charging status information. The server also includes a charger management database storing the charging status information and the compatibility information. As the charging status information, the information acquisition unit acquires vehicle information on the vehicle, charger information on the external (Continued)

charger connected with the vehicle, and charging error information on a charging error caused between the external charger and the vehicle.

10 Claims, 5 Drawing Sheets

(51) Int. Cl.
    *B60L 53/65*         (2019.01)
    *B60L 53/68*         (2019.01)
    *H02J 7/47*          (2026.01)

(52) U.S. Cl.
    CPC ........... *H02J 7/47* (2026.01); *B60L 2240/527* (2013.01); *B60L 2240/72* (2013.01)

(56) References Cited

U.S. PATENT DOCUMENTS

| | | | |
|---|---|---|---|
| 2012/0123670 A1 | 5/2012 | Uyeki | |
| 2013/0031121 A1 | 1/2013 | Sera et al. | |
| 2014/0184141 A1* | 7/2014 | Loftus | B60L 3/00 |
| | | | 320/104 |
| 2016/0124050 A1* | 5/2016 | Hua | B60L 53/68 |
| | | | 320/109 |
| 2019/0109462 A1* | 4/2019 | Götz | H01M 10/44 |
| 2019/0168619 A1* | 6/2019 | Hooker | B60L 53/14 |
| 2019/0232813 A1 | 8/2019 | Kusumi | |
| 2019/0308517 A1 | 10/2019 | Nishida | |
| 2022/0289065 A1 | 9/2022 | Matsuda et al. | |
| 2023/0356621 A1* | 11/2023 | Bennett | B60L 3/0069 |
| 2024/0092210 A1* | 3/2024 | Kim | B60L 53/67 |

FOREIGN PATENT DOCUMENTS

| | | |
|---|---|---|
| CN | 111376781 A | 7/2020 |
| CN | 112368874 A | 2/2021 |
| EP | 3517351 A1 | 7/2019 |
| JP | 2011237406 A | 11/2011 |
| JP | 2015039289 A | 2/2015 |
| JP | 2019129671 A | 8/2019 |
| JP | 2020108244 A | 7/2020 |
| KR | 20150112459 A | 10/2015 |
| KR | 20210061515 A | 5/2021 |
| WO | 2015040742 A1 | 3/2015 |

OTHER PUBLICATIONS

Notice of Reasons for Refusal dated Mar. 12, 2024 in related/corresponding JP Application No. 2022-200159.
Office Action dated Mar. 11, 2025 in related/corresponding KR Application No. 10-2024-7040141.
Office Action dated Mar. 29, 2025 in related/corresponding CN Application No. 202380045036.9.
Office Action dated Sep. 23, 2025 in related/corresponding KR Application No. 10-2024-7040141.

\* cited by examiner

FIG.2A

FIRST EXTERNAL CHARGER

<GENERAL INFORMATION>
MADE BY MANUFACTURER A, LABELED WITH
MODEL NO. aa-11, AND COMPLYING WITH VER. 0.x
OF THE STANDARD
<INSULATION TEST INFORMATION>
VOLTAGE WAVEFORM SHOWN ON THE RIGHT
<CHARGING CONTROL PROTOCOL INFORMATION>
BEHAVIOR A TYPE
<INFORMATION ON COMPATIBILITY WITH HOST VEHICLE>
COMPATIBLE

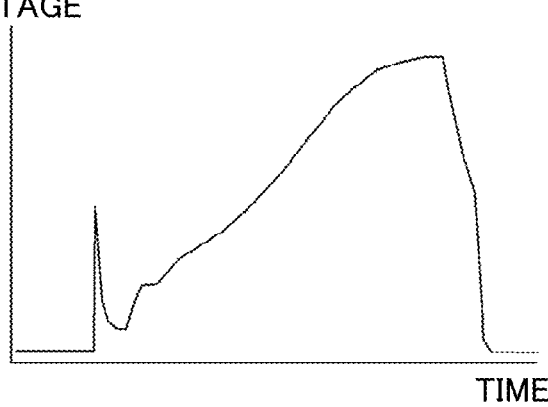

FIG.2B

SECOND EXTERNAL CHARGER

<GENERAL INFORMATION>
MADE BY MANUFACTURER B, LABELED WITH
MODEL NO. bb-05, AND COMPLYING WITH VER. 1.x
OF THE STANDARD
<INSULATION TEST INFORMATION>
VOLTAGE WAVEFORM SHOWN ON THE RIGHT
<CHARGING CONTROL PROTOCOL INFORMATION>
BEHAVIOR B TYPE
<INFORMATION ON COMPATIBILITY WITH HOST VEHICLE>
INCOMPATIBLE

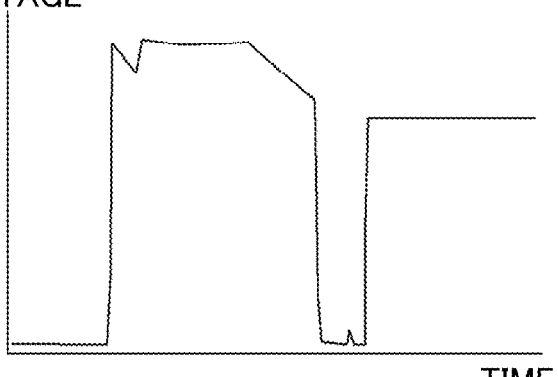

FIG.2C

THIRD EXTERNAL CHARGER

<GENERAL INFORMATION>
MADE BY MANUFACTURER C, LABELED WITH
MODEL NO. cc-15, AND COMPLYING WITH VER. 2.x
OF THE STANDARD
<INSULATION TEST INFORMATION>
VOLTAGE WAVEFORM SHOWN ON THE RIGHT
<CHARGING CONTROL PROTOCOL>
BEHAVIOR A TYPE
<INFORMATION ON COMPATIBILITY WITH HOST VEHICLE>
INCOMPATIBLE

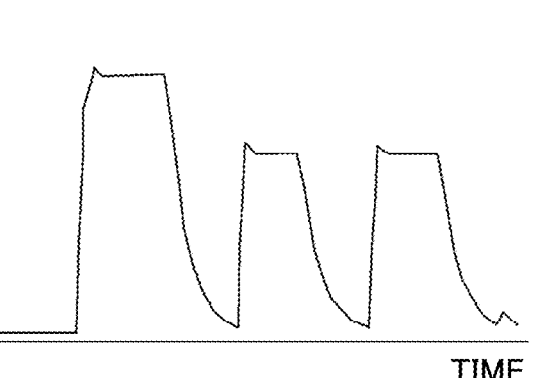

FIG.3

| CHARGING PROCESS | | ERROR TYPE | EXEMPLARY ERROR | IMPORT-ANCE/ URGENCY |
|---|---|---|---|---|
| AT PRE-CHARGING PROCESS | CHARGING CONNECTOR CONNECTION | CHARGING ACTIVATION ERROR | FAILURE IN CHARGING AUTHORIZATION SYSTEM, FAILURE IN COMMUNICATIONS ERROR IN CHARGING ACTIVATION SIGNAL INPUT, FAILURE IN CIRCUIT DISCONNECTION OF CHARGING CONNECTOR OR CABLE | NORMAL |
| | CHARGER CONNECTOR LOCK | LOCK MECHANISM ERROR | FAILURE IN LOCK MECHANISM OF CHARGING CONNECTOR | HIGH |
| | CHARGING CONTROL PROTOCOL COMMUNICATIONS | PROTOCOL ERROR | INCOMPATIBILITY OF CHARGING PARAMETERS (VOLTAGES ETC.) TRANSMITTED FROM CHARGER | NORMAL |
| | INSULATION TEST EXECUTION (VOLTAGE APPLICATION) | INSULATION ERROR | INSULATION FAILURE IN CONNECTOR OR CABLE OF CHARGER | HIGH |
| DURING CHARGING | | CHARGING INTERRUPTION ERROR | UNUSUAL CHARGING OUTPUT OVERVOLTAGE AND OVERCURRENT OVERHEATING OF CONNECTOR INSULATION FAILURE IN HIGH-VOLTAGE CIRCUIT | NORMAL |
| ON COMPLETION OF CHARGING | | CHARGING COMPLETION ERROR | FAILURE TO STOP COMMUNICATION PROTOCOL OVERVOLTAGE FAILURE TO UNLOCK CONNECTOR UNUSUAL DETECTION IN CHARGER | NORMAL |

CHARGER MANAGEMENT DEVICE AND CHARGING CONTROL DEVICE

TECHNICAL FIELD

The present disclosure relates to a charger management device and a charging control device.

BACKGROUND ART

An external charger and an automobile, such as an electric vehicle or a hybrid vehicle, cannot be physically or electrically connected to conduct charging from the external charger to the automobile unless their charging method standards are compatible with each other.

Patent Document 1 discloses a technique for extracting an external charger (a charging station) of which the charging method standard is compatible with that of the vehicle, and then providing the vehicle with position information on the external charger or indicating a route to the external charger. Patent Document 2 discloses a technique for using a database to accumulate charging history information acquired when a vehicle uses an external charger (a charging facility).

CITATION LIST

Patent Document

Patent Document 1: Japanese Unexamined Patent Publication No. 2015-39289

Patent Document 2: Japanese Unexamined Patent Publication No. 2011-237406

SUMMARY OF THE INVENTION

Technical Problem

However, DC chargers for quick charging in particular, even if the standards are compatible, may cause charging troubles, such as failure in normal start of charging, delay in charging, and other troubles in the vehicle or the external charger, due to electrical compatibility failures (the so-called compatibility issues) between a particular vehicle and a particular external charger.

Patent Documents 1 and 2 fail to refer to the so-called compatibility issues, and thus charging troubles may occur even if an external charger assumed to be compliant with the standard is proposed. If a charging trouble occurs, charging history information cannot be collected, and the technique of Patent Document 2 cannot achieve accumulation of information in a database. In Patent Document 2, when the external charger and the vehicle are connected, the vehicle acquires relevant information on the external charger via a power line connected with the external charger. However, if the standard does not include such a structure or a communication protocol, the vehicle can hardly even identify the external charger.

Thus, a technique for avoiding use of external chargers that may cause charging troubles, considering the compatibility issue between the vehicle and the external charger as well, is required.

In view of the foregoing, an object of the present application is to provide a charger management device and a charging control device that can avoid charging troubles and that can improve charging convenience of electric vehicles.

Solution to the Problem

The present disclosure has been made to overcome at least some of the problems described above, and can be implemented as the following embodiments or application examples.

A charger management device according to an aspect (1) of the application example is a charger management device for managing compatibility between an external charger and a vehicle, the charger management device including: an information acquisition unit configured to acquire charging status information on a status acquired when the external charger and the vehicle are connected to conduct charging; a compatibility information generation unit configured to generate compatibility information on compatibility between the external charger and the vehicle based on the charging status information; and a management storage unit configured to store the charging status information and the compatibility information, wherein as the charging status information, the information acquisition unit acquires vehicle information on the vehicle, charger information on the external charger connected with the vehicle, and charging error information on a charging error caused between the external charger and the vehicle.

The charger management device of the application example acquires the charging error information in addition to the information on the vehicle and the external charger as the charging status information acquired when the external charger is connected to the vehicle to conduct charging. Then, based on such charging status information, the compatibility information between the external charger and the vehicle is generated and stored in the management storage unit, thereby creating a database. By constructing such a database, it is possible to find an external charger that may cause charging troubles, considering the compatibility issue between the vehicle and the external charger as well. Accordingly, charging troubles can be avoided, and charging convenience of electric vehicles can be improved.

An aspect (2) of the application example is an embodiment of the charger management device of the aspect (1). In the aspect (2), as the charging error information, the information acquisition unit may include information on a charging error caused in a pre-charging process conducted from when the external charger is connected to when a driving battery of the vehicle starts being charged.

Accordingly, by acquiring the charging error information on charging errors caused in the pre-charging process and creating a database, the charger management device can find incompatibility between the external charger and the vehicle before charging begins. Thus, charging troubles can be avoided in advance.

An aspect (3) of the application example is an embodiment of the charger management device of the aspect (1). In the aspect (3), as the charger information, the information acquisition unit may acquire and include identification information on the external charger identified based on the pre-charging process conducted from when the external charger is connected to when a driving battery of the vehicle starts being charged.

Accordingly, by acquiring the identification information on the external charger based on the pre-charging process information and creating a database, it is possible to identify the external charger even if the vehicle and the external charger cannot directly communicate with each other. Thus, more convenient database can be constructed.

An aspect (4) of the application example is an embodiment of the charger management device of the aspect (3). In the aspect (4), the pre-charging process may include an insulation test in which a voltage is applied from the external charger to the vehicle to confirm an insulation status, and the identification information may be information on the external charger identified based on behavior characteristics of a voltage value applied in the insulation test. Normally, for quick charging, the insulation test is performed as the pre-charging process, where the behavior of a voltage value varies with the external charger. Thus, by identifying the external charger based on the behavior characteristics of the voltage value, it is possible to easily identify the external charger without communications or the like with the external charger.

An aspect (5) of the application example is an embodiment of the charger management device of the aspect (1). In the aspect (5), the charger management device may further include a distribution information generation unit configured to generate distribution information including the compatibility information and distribute the distribution information to each vehicle. The compatibility information is distributed to each vehicle in this manner, whereby charging troubles for each vehicle can be avoided, and charging convenience of electric vehicles can be improved.

A charging control device according to an aspect (6) of the application example is a charging control device for controlling charge from an external charger to a driving battery of a vehicle, the charging control device including: a charging error detection unit configured to detect a charging error caused between the external charger and the vehicle connected to each other; a charging status information generation unit configured to generate charging status information on a status acquired when the external charger and the vehicle are connected to conduct charging; and a communication unit configured to transmit the charging connection status information to an external device via a network, wherein as the charging status information, the charging status information generation unit generates information including vehicle information on the vehicle, charger information on the external charger connected with the vehicle, and charging error information on an error detected by the charging error detection unit.

That is, the charging control device for the vehicle of the application example transmits, to the external device, and shares, with the external device, the charging error information in addition to the information on the host vehicle and the external charger as the charging status information acquired when the external charger is connected to conduct charging. By sharing such information, it is possible to find an external charger that may cause charging troubles, considering the compatibility issue between the vehicle and the external charger as well. Accordingly, charging troubles can be avoided, and charging convenience of electric vehicles can be improved.

An aspect (7) of the application example is an embodiment of the charging control device of the vehicle of the aspect (6). In the aspect (7), as a charging error, the charging error detection unit may detect a charging error caused in a pre-charging process conducted from when the external charger is connected to when the driving battery starts being charged.

By sharing the charging error information on charging errors caused in the pre-charging process, the charging control device of the vehicle can find incompatibility between the external charger and the vehicle before charging begins. Thus, charging troubles can be avoided in advance.

An aspect (8) of the application example is an embodiment of the charging control device of the vehicle of the aspect (6). In the aspect (8), the charging control device may further include a charger identification unit configured to identify the external charger based on a pre-charging process conducted from when the external charger is connected to when the driving battery starts being charged, as the charger information, the charging status information generation unit may generate the charging status information including identification information of the external charger identified by the charger identification unit.

Accordingly, by transmitting the identification information on the external charger based on the pre-charging process information to an external device, it is possible to identify the external charger even if the vehicle and the external charger cannot directly communicate with each other. Thus, more convenient information can be shared.

An aspect (9) of the application example is an embodiment of the charging control device of the vehicle of the aspect (8). In the aspect (9), the pre-charging process may be an insulation test in which a voltage is applied from the external charger to the vehicle to confirm an insulation status, and the charger identification unit may identify the external charger based on behavior characteristics of a voltage value applied in the insulation test. Normally, for quick charging, the insulation test is performed as the pre-charging process, where the behavior of a voltage value varies with the external charger. Thus, by identifying the external charger based on the behavior characteristics of the voltage value, it is possible to easily identify the external charger without communications or the like with the external charger.

An aspect (10) of the application example is an embodiment of the charging control device of the vehicle of the aspect (6). In the aspect (10), the communication unit may acquire from an external device compatibility information that is generated based on the charging status information and that relates to compatibility between the external charger and the vehicle; and the charging control device may further include a charging control unit configured to stop charging if the external charger and the vehicle connected to each other are incompatible with each other according to the compatibility information. Charging is stopped if the external charger and the vehicle connected to each other are not compatible with each other according to the acquired compatibility information, whereby charging troubles can be avoided, and charging convenience of electric vehicles can be improved.

BRIEF DESCRIPTION OF THE DRAWINGS

FIG. 2A is an example of first external charger information.

FIG. 2B is an example of second external charger information.

FIG. 2C is an example of third external charger information.

FIG. 3 is a table of charging errors.

DESCRIPTION OF EMBODIMENT

An embodiment of the present disclosure will be described below.

Figure 1:
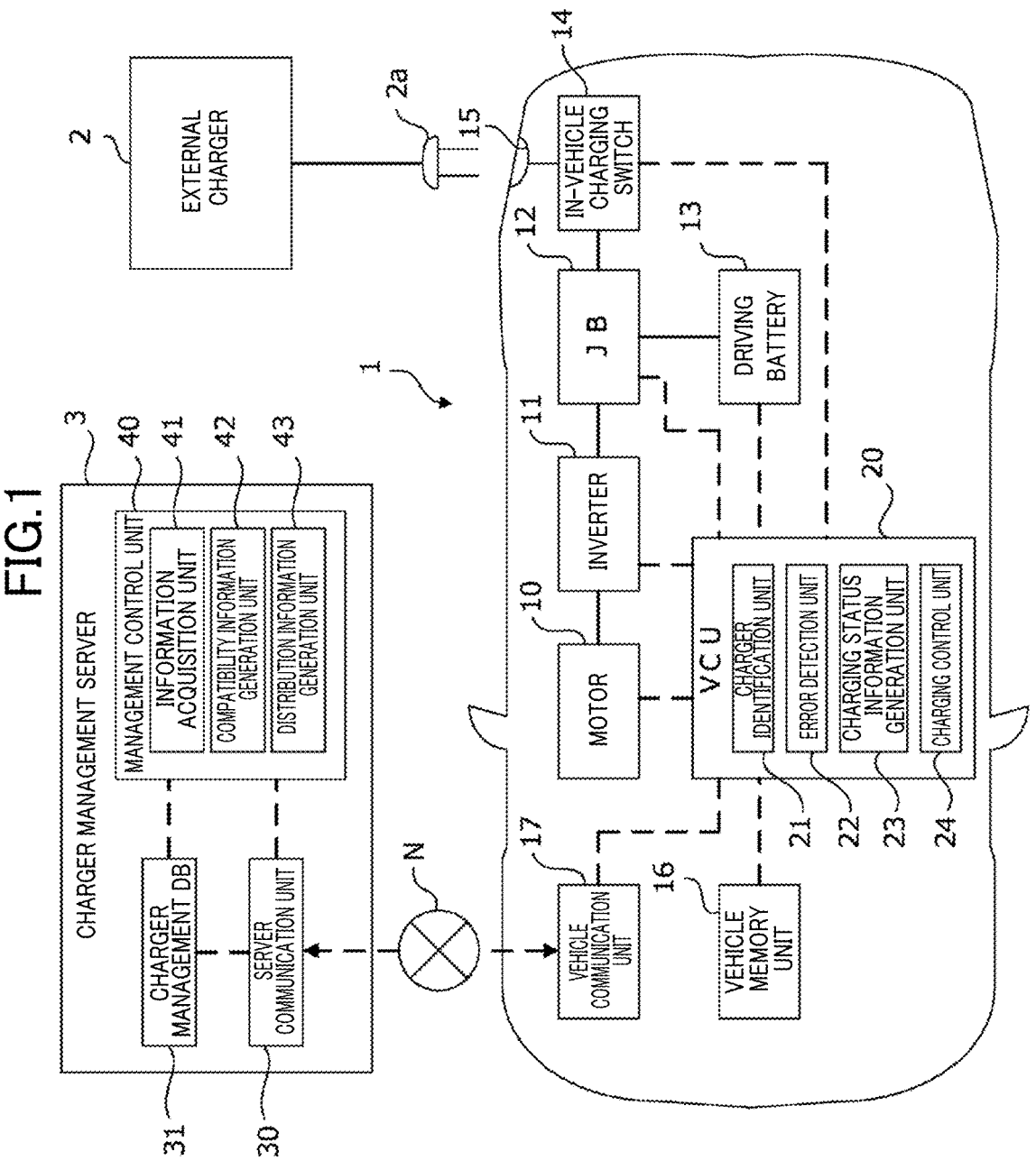
FIG. 1 is a schematic configuration diagram of a charger management system including a charger management device and a charging control device according to a first embodiment of the present disclosure.

FIG. 1 is a schematic configuration diagram of a charger management system including a charger management device and a charging control device according to an embodiment of the present disclosure. FIGS. 2A to 2C show examples of external charger information. Based on the drawings, configurations of the charger management system including the charger management device and the charging control device according to the embodiment will be described below.

The charger management system of the embodiment shown in FIG. 1 mainly includes: a vehicle 1 having a charging control device; an external charger 2 for charging the vehicle; and a charger management server 3 (charger management device) connected with and capable of interactively communicating with the vehicle 1 via a network N. For the sake of simplicity of explanation, FIG. 1 shows one vehicle 1, one external charger 2, and one charger management server 3, but there may be a plurality of these devices in the charger management system.

External Charger

The external charger 2 is charging equipment for supplying electric power to the vehicle 1. In the embodiment, the external charger 2 is a direct-current (DC) quick charger capable of charging the vehicle 1 with direct current at a predetermined voltage (450V) and a predetermined output (for example, 50 KW) or more. The external charger 2 includes a cable, and an end of the cable is provided with a connector 2a that can be connected with the vehicle 1. The external charger 2 of the embodiment is a charger complying with CHAdeMO (registered trademark), a DC quick charging standard. However, the present disclosure is not limited to this charging standard and may adopt other standards.

Vehicle

The vehicle 1 is, for example, an electric vehicle, and is equipped with a traveling motor 10 (hereinafter referred to as a motor 10) as a power source. Although not shown, the motor 10 includes an output shaft connected to right and left drive wheels via a power transmission part and a drive shaft, where the power transmission part consists of a deceleration device and a differential device. The motor 10 generates driving force that is transmitted to the drive wheels, thereby enabling the vehicle 1 to travel.

The motor 10 is electrically connected to a driving battery 13 with a high voltage (for example, 200V) via an inverter-converter (hereinafter simply referred to as an inverter 11) and a junction box 12.

The driving battery 13 is a secondary battery such as a lithium ion battery. The driving battery 13 converts DC power in storage into AC power through the inverter 11 and supplies the AC power to the motor 10. Further, for example, when the vehicle 1 decelerates or travels on a downhill road (regenerative traveling), reverse driving force from the drive wheel side allows the motor 10 to operate as a generator (regenerative operation). The vehicle 1 can also charge the driving battery 13 with electric power generated by the motor 10.

The junction box 12 has a function of connecting and disconnecting the driving battery 13 and the electric devices mounted on the vehicle 1. Inside the junction box 12, electric paths that electrically connect the driving battery 13 and the electric devices are provided, and also switches such as contactors (electromagnetic contactors), relays, and the like that connect and disconnect the electric paths are provided.

By connection and disconnection of the switches, supply and blockage of electric power from the driving battery 13 to the electric devices can be controlled. One of the electric devices connected to the junction box 12 is an in-vehicle charging switch 14.

The in-vehicle charging switch 14 includes a filter, a power conversion circuit, and a relay (not shown), and has a function of supplying the driving battery 13 with electric power supplied from the external charger 2. The in-vehicle charging switch 14 has a function of communicating with the external charger 2. The in-vehicle charging switch 14 is connected with a charging inlet 15. The charging inlet 15 includes a receiving terminal for quick charging that is connected and fitted with the connector 2a of the external charger 2.

When the charging inlet 15 is connected with the connector 2a, the external charger 2 performs a pre-charging process for the vehicle 1 (more precisely, for the in-vehicle charging switch 14). The pre-charging process includes at least an insulation test. The insulation test is a test in which when the charging inlet 15 is connected with the connector 2a, the external charger 2 applies a voltage to the vehicle 1 before charging begins, to confirm an insulation status between the external charger 2 and the vehicle 1. The behavior characteristics of a voltage value applied in this insulation test vary with the external charger 2. The external charger 2 does not start charging if the insulation test confirms that they are not insulated. On the other hand, if the insulation test confirms that they are insulated, the external charger 2 gives a charge permission to the vehicle 1 to start charging, and the vehicle 1 turns on the relay of the in-vehicle charging switch 14.

The pre-charging process includes a process of checking a charging control protocol. A standardized protocol is basically used as the charging control protocol. However, the in-vehicle charging switch 14 checks the charging control protocol before charging begins because the behaviors of communication procedures and the like vary in detail with the external charger.

The vehicle 1 is provided with a vehicle memory unit 16, a vehicle communication unit 17, and a vehicle control unit 20 (hereinafter referred to as a VCU 20).

The vehicle memory unit 16 is an auxiliary memory device such as a hard disk, a solid state drive (SSD), or the like, and stores relevant information. The vehicle memory unit 16 of the embodiment stores vehicle information on the host vehicle, charger information on the external charger 2, compatibility information distributed from the charger management server 3, and charging error information described later.

The vehicle information includes information on the host vehicle, such as the manufacturer, the vehicle type, the model, the date of manufacture, and the like.

The charger information includes general information on the external charger, pre-charging process information, and installation position information on a position at which the external charger is installed. The general information on the external charger includes information on the external charger, such as the manufacturer, the model number, the standard, the version of the standard, and the like. Information about charging performance of the external charger, such as a possible output current and a possible output voltage, may also be included. The pre-charging process information includes insulation test information including the behavior characteristics (specifically, voltage waveforms) of a voltage value in the above-described insulation test, and includes protocol information including the behavior and the like of the above-described charging control protocol. The installation position information is information on a position at which the external charger is installed, such as a latitude, a longitude, an altitude, and the like. The external charger information is not limited thereto, and may include other information such as image information showing an appearance of the external charger.

The compatibility information includes information on compatibility between the external charger and the host vehicle. The compatibility information includes information on "compatible" cases where the external charger can conduct charging without causing charging errors, and also includes information on "incompatible" cases where the external charger has problems in charging the host vehicle, such as that the external charger has caused a charging error with a host vehicle of the same type before. In addition, for example, information on "unknown" cases where the external charger has never been connected with a vehicle of the same type may be included. Further, the importance or urgency of "incompatible" cases may be set so that the procedure for stopping a charge and the type of alert, both of which will be described later, can be changed according to the importance or urgency.

The compatibility information also includes charger information for identifying the external charger. Specifically, FIGS. 2A to 2C show examples of the compatibility information. The examples of the compatibility information stored in the vehicle memory unit 16 will be described below.

FIG. 2A shows the first external charger made by the manufacturer A, labeled with the model number aa-11, and complying with the version 0.x of the standard. FIG. 2A also shows the behavior characteristics of a voltage value where a voltage gradually rises toward the latter half of the insulation test. FIG. 2A also shows that the charging control protocol is of behavior A type. According to the figure, the first external charger is confirmed compatible with the host vehicle.

FIG. 2B shows the second external charger made by the manufacturer B, labeled with the model number bb-05, and complying with the version 1.x of the standard. FIG. 2B also shows the behavior characteristics of a voltage value where a voltage rises twice in the insulation test. FIG. 2B also shows that the charging control protocol is of behavior B type. According to the figure, the second external charger is confirmed not compatible (or is incompatible) with the host vehicle. In this way, an early version of the standard may yield an incompatible result.

FIG. 2C shows the third external charger made by the manufacturer C, labeled with the model number cc-15, and complying with the version 2.x of the standard. FIG. 2C also shows the behavior characteristics of a voltage value where a voltage rises three times in the insulation test. FIG. 2C also shows that the charging control protocol is of behavior A type. According to the figure, the third external charger is confirmed not compatible (or is incompatible) with the host vehicle. In this way, even the same version of the standard as that of the first external charger that is compatible with the host vehicle may yield an incompatible result.

The charger information and the compatibility information are stored in the vehicle memory unit 16 of the vehicle 1 and also stored in a charger management database 31 described later of the charger management server 3.

The vehicle communication unit 17 is a communication device capable of wirelessly communicating with an external information network such as the Internet, a dedicated network, or the like. In the embodiment, the vehicle communication unit 17 is connected with and is capable of interactively communicating with a server communication unit 30 of the charger management server 3 via the network N.

The VCU 20 is a computer including: a central processing unit (CPU); a main memory device (a ROM, a RAM, etc.) for storing control programs, control maps, and the like; an input/output device; a timer counter; and the like. Via a control area network (CAN) as an in-vehicle communication network, the VCU 20 is communicably connected with devices or other control units mounted in the vehicle 1. The VCU 20 of the embodiment is communicably connected with the motor 10, the inverter 11, the junction box 12, the driving battery 13, the in-vehicle charging switch 14, the vehicle memory unit 16, and the vehicle communication unit 17. The VCU 20 can execute control related to quick charging conducted in the vehicle 1 by the external charger 2.

Specifically, the VCU 20 includes: a charger identification unit 21 for identifying the connected external charger 2; an error detection unit 22 (charging error detection unit) for detecting a charging error caused with the connected external charger 2; a charging status information generation unit 23 for generating charging status information on a status at a time when the external charger 2 is connected to conduct charging; and a charging control unit 24 for controlling matters related to charging the driving battery 13.

The charger identification unit 21 has a function of identifying the external charger 2 based on a pre-charging process conducted before the external charger 2 connected starts charging the driving battery 13. Specifically, the charger identification unit 21 collates the pre-charging process conducted before the external charger 2 connected starts charging the driving battery 13 and the pre-charging process information stored in the vehicle memory unit 16, thereby specifying the general information on the external charger 2 in order to identify the external charger 2. For example, the charger identification unit 21 identifies the external charger 2 from the behavior characteristics of a voltage value obtained by detecting and analyzing a voltage applied to the in-vehicle charging switch 14 in the insulation test as the pre-charging process. Further, the charger identification unit 21 of the embodiment may acquire information such as a charging control protocol that is transmitted from the external charger 2 to the vehicle 1 when the external charger 2 is connected; and may take this information into account as supplementary information to identify the external charger 2. Further, the charger identification unit 21 of the embodiment may identify the external charger 2 by comparing a vehicle GPS (not shown) with the position information included in the charger information. Further, the charger identification unit 21 may identify the external charger 2 by using an in-vehicle camera (not shown) or the like to capture a charger image covering the connected external charger 2, and then comparing appearance information (for example, colors, display logos, and the like) on the external charger 2 obtained by analyzing the charger image with image information included in the charger information.

The error detection unit 22 has a function of detecting charging errors that occur from when the external charger 2 is connected to when charging is completed in order to generate charging error information. For example, the error detection unit 22 detects charging errors, each made distinguishable according to the stage (charging process) at which it occurs. The stage includes the stage of the pre-charging process from when the external charger 2 is connected to when the driving battery starts being charged; the subsequent stage during charging; and the stage at the completion of charging. If no charging error is detected at each stage, charging error information indicative of no error being found is generated.

Specifically, types and examples of charging errors are shown in FIG. 3.

As shown in the figure, the pre-charging process includes charging connector connection, charging control protocol communication, charger connector lock, and insulation test execution (voltage application).

Exemplary errors at the time of charging connector connection include failure to recognize a connection with the vehicle 1 due to failure in the charging authorization system or failure in communications in the external charger 2; failure to activate the external charger 2 due to a charging activation signal input error or a circuit failure in the external charger 2; and failure to start charging due to disconnection of a connector or a cable in the external charger 2. The error detection unit 22 detects these charging errors caused at the time of charging connector connection as charging activation errors.

Exemplary errors at the time of charger connector lock include failure to lock the connector 2a of the external charger 2 due to failure in the lock mechanism of the connector 2a. The error detection unit 22 detects this charging error caused at the time of charger connector lock as a lock mechanism error. The lock mechanism error includes detachment of the connector 2a which might cause electric shock accidents. Thus, its importance or urgency is set higher than normal.

Exemplary errors at the time of charging control protocol communication include incompatibility of charging parameters (transmission signals, voltages, and the like) from the external charger 2 to the vehicle 1. The error detection unit 22 detects this charging error caused at the time of charging protocol communication as a protocol error.

Exemplary errors at the time of insulation test execution (voltage application) include insulation failure in the connector 2a or a cable of the external charger found by the insulation test. The error detection unit 22 detects this charging error caused at the time of insulation test execution as an insulation error. The insulation error includes insulation failure which might cause electric shock accidents. Thus, its importance or urgency is set higher than normal.

Exemplary errors during charging include unusual charging outputs, overvoltage, and overcurrent in the external charger 2; overheating of the connector 2a; and insulation failure in a high-voltage circuit of the external charger 2. If these charging errors occur, the charging is interrupted and the error detection unit 22 detects the errors as charging interruption errors.

Exemplary errors at the time of charging completion include failure to stop the communication protocol; overvoltage due to failure of the external charger 2 to complete charging; failure to unlock the connector 2a; and other unusual detections in the charger. The error detection unit 22 detects these charging errors caused at the time of charging completion as charging completion errors.

The charging status information generation unit 23 has a function of generating charging status information on a status at a time when the external charger 2 is connected. Specifically, as the charging status information, the charging status information generation unit 23 generates information including the vehicle information stored in the vehicle memory unit 16, the charger information on the external charger 2 identified by the charger identification unit 21, and the charging error information on charging errors detected by the error detection unit 22. The charging status information generation unit 23 transmits the generated charging status information to the charger management server 3 via the vehicle communication unit 17.

Note that even if the external charger which is not stored in the vehicle memory unit 16 is connected, that is, even if the external charger cannot be identified by the charger identification unit 21, the charging status information generation unit 23 uploads the pre-charging process information acquired in the vehicle 1, the pre-charging process information such as the charging control protocol information, and the charging error information to the charger management server 3 as the charging status information via the vehicle communication unit 17. By updating the charger management database 31 in this way based on the external charger information acquired in the vehicle, the external charger information can be automatically accumulated.

The charging control unit 24 has a function of not allowing start of charging if the external charger identified by the charger identification unit 21 is not an external charger compatible with the host vehicle. Specifically, the charging control unit 24 acquires, from the vehicle memory unit 16, the compatibility information corresponding to the external charger 2 identified by the charger identification unit 21; and then performs control for not allowing start of charging if the external charger 2 is not an external charger compatible with the host vehicle. On the other hand, the charging control unit 24 performs control for allowing start of charging if the external charger 2 is an external charger compatible with the host vehicle. In the embodiment, the control for allowing or not allowing start of charging is performed by ON/OFF control of the relay of the in-vehicle charging switch 14. The charging control unit 24 also controls other matters related to charging, such as determining whether the connector 2a of the external charger 2 is connected to the charging inlet 15.

In addition, if stopping a charge not to allow start of charging, the charging control unit 24 can also conduct an alerting process for alerting a charging operator such as a driver that charging is not to be started. Specifically, the charging control unit 24 performs the alerting process such as turning on an indicator in a meter panel of the vehicle 1 to indicate failure in charging; having a display screen of the vehicle 1 show an error message; and sounding an alarm.

The charging control unit 24 can update the information in the vehicle memory unit 16 by acquiring the distribution information including the latest charger information and compatibility information via the vehicle communication unit 17 from the charger management database 31 of the charger management server 3. The charging control unit 24 updates the information in the vehicle memory unit 16 sequentially or regularly.

Figure 4:
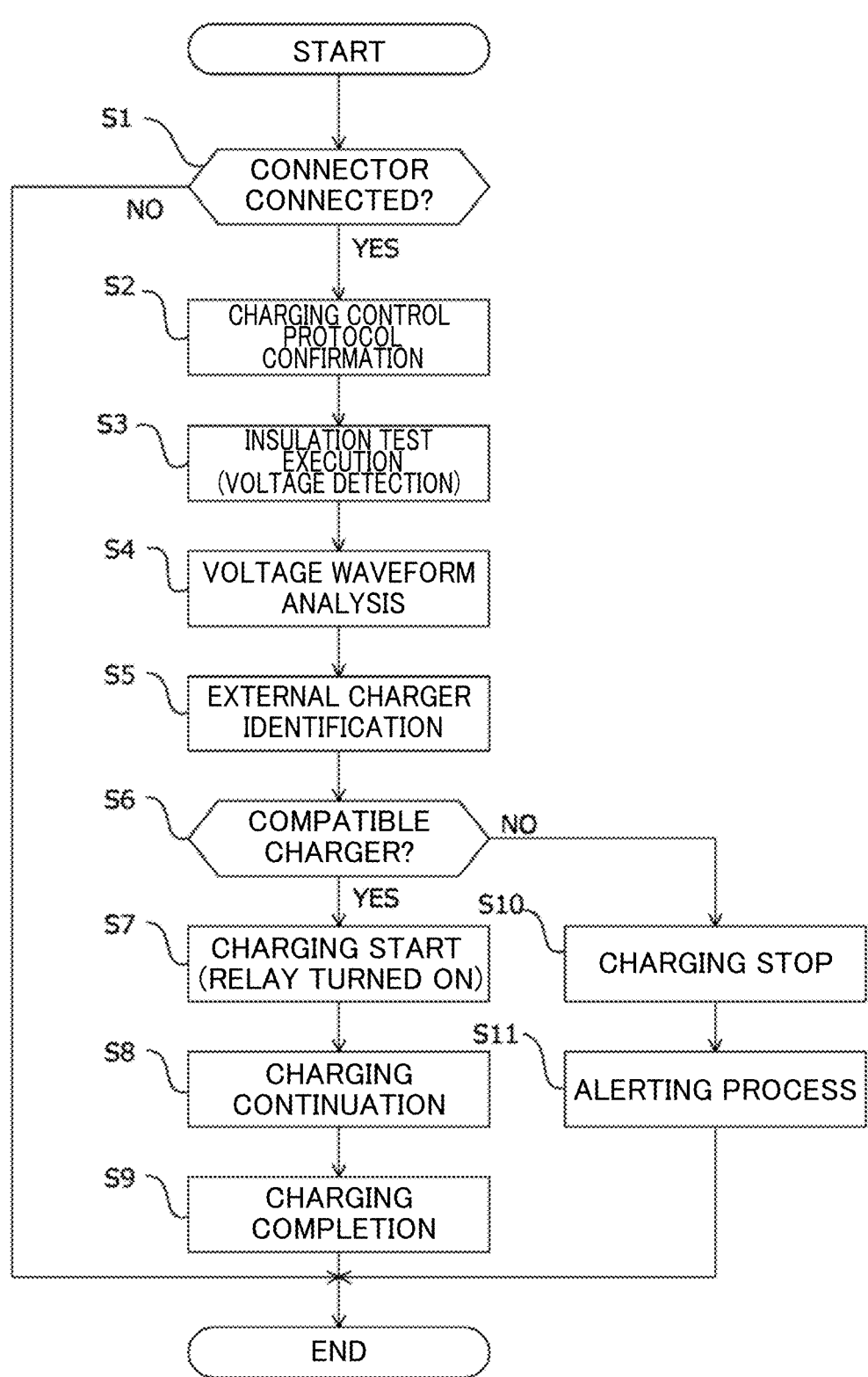
FIG. 4 is a flowchart of a charging control routine executed by a VCU.

FIG. 4 is a flowchart of a charging control routine executed by the VCU 20 of the embodiment. The procedure of charging control in the vehicle of the embodiment will be described below with reference to the flowchart.

First, in step S1, the charging control unit 24 of the VCU 20 determines whether the connector 2a of the external charger 2 is connected to a receiving terminal for quick charging of the charging inlet 15. If the determination result is false (No), the VCU 20 ends the charging control routine. On the other hand, if the determination result is true (Yes), that is, if the connector 2a is connected, the VCU 20 proceeds to step S2. If a charging error occurs in step S1, the error detection unit 22 detects an error related to activation of the external charger 2 as a charging activation error, and detects an error related to the lock mechanism of the connector 2a as a lock mechanism error.

In step S2, the charger identification unit 21 of the VCU 20 confirms the charging control protocol that is the pre-charging process. Specifically, the charging control unit 24 acquires information such as the charging control protocol transmitted from the external charger 2 to the vehicle 1. If the acquisition of the information such as the charging control protocol is completed, the VCU 20 proceeds to step S3. If a charging error occurs in step S2, the error detection unit 22 detects the charging error as a protocol error.

In step S3, the external charger 2 performs the insulation test. At this time, the charger identification unit 21 of the VCU 20 sequentially detects voltages applied from the external charger 2 and stores the voltages in the vehicle memory unit 16. If the insulation test is completed, the VCU 20 proceeds to step S4. If a charging error occurs in step S3, the error detection unit 22 detects the charging error as an insulation error.

In step S4, based on the voltage detected in step S3, the charger identification unit 21 of the VCU 20 analyzes a voltage waveform which is a behavior characteristic of a voltage value. If the analysis of the voltage waveform is completed, the VCU 20 proceeds to step S5.

In step S5, the charger identification unit 21 of the VCU 20 identifies the connected external charger 2. Specifically, the charger identification unit 21 refers to the external charger information that is stored in the vehicle memory unit 16 and that contains a voltage waveform identical or similar to the voltage waveform analyzed in step S4, thereby specifying the external charger information of the external charger 2 connected this time. If multiple pieces of external charger information, each containing a voltage waveform identical or similar to the analyzed voltage waveform, are present in the vehicle memory unit 16, or if no piece of external charger information containing a voltage waveform identical or similar to the analyzed voltage waveform is present in the vehicle memory unit 16, the external charger information is specified, considering the information such as the charging control protocol acquired in step S2 as well.

In step S6, the charging control unit 24 of the VCU 20 collates the external charger information specified in step S5 and the compatibility information stored in the vehicle memory unit 16, thereby determining whether the external charger 2 connected this time is an external charger compatible with the host vehicle. If the determination result is true (Yes), that is, if it is confirmed from the external charger information that the external charger is compatible with the host vehicle, the VCU 20 proceeds to step S7. Note that if the specified external charger information does not contain registered information on the compatibility with the host vehicle, or if the external charger cannot be identified in step S5, the charging control unit 24 determines that the determination result in step S6 is true (Yes); proceeds to step S7; and stores newly acquired information in the vehicle memory unit 16 as new external charger information.

In step S7, the charging control unit 24 of the VCU 20 allows start of charging. Specifically, the charging control unit 24 performs control to turn on the relay of the in-vehicle charging switch 14.

In step S8, the charging control unit 24 of the VCU 20 allows continuation of charging unless an error occurs. If a charging error occurs in step S8, the error detection unit 22 detects the charging error as a charging interruption error.

In step S9, the charging control unit 24 of the VCU 20 performs a charging completion process if charging completion conditions are satisfied. The charging completion conditions include, for example, reaching a predetermined charging time, reaching a predetermined state of charge (SOC) of a driving battery, and the like. In the charging completion process, specifically, the charging control unit 24 performs control to turn off the relay of the in-vehicle charging switch 14, thereby stopping a charge. If a charging error occurs in step S9, the error detection unit 22 detects the charging error as a charging completion error.

On the other hand, if the determination result of step S6 is false (No), that is, if it is confirmed from the compatibility information that the connected external charger 2 is incompatible with the host vehicle, the VCU 20 proceeds to step S10.

In step S10, the charging control unit 24 of the VCU 20 performs control not to allow the external charger 2 to start charging. Specifically, the charging control unit 24 performs control to turn off the relay of the in-vehicle charging switch 14, thereby stopping a charge. If the control for stopping a charge is completed, the VCU 20 proceeds to step S11.

In step S11, the charging control unit 24 of the VCU 20 performs an alerting process. Specifically, the charging control unit 24 turns on an indicator to indicate failure in charging; makes an error message displayed; and sounds an alarm. If the alerting process is completed, the VCU 20 completes the routine.

The above procedure of charging control is a flow in which charging errors do not occur. If a charging error occurs in any of the steps, the charging control unit 24 performs the charging completion process at that time. In particular, if a charging error with the importance or urgency ranked high is detected, charging is immediately stopped and a higher alert than normal is issued.

As described above, the vehicle 1 provided with the charging control device (the VCU 20) of the charging management system according to the embodiment transmits, to the charger management server 3, and shares, with the charger management server 3, the charging error information in addition to the information on the host vehicle and the external charger 2 as the charging status information acquired when the external charger 2 is connected to conduct charging. By sharing such information, it is possible to find an external charger that may cause charging troubles, considering the compatibility issue between the vehicle and the external charger as well. Accordingly, charging troubles can be avoided, and charging convenience of electric vehicles can be improved.

In addition, by sharing the charging error information on charging errors caused in the pre-charging process, the VCU 20 of the vehicle 1 can find incompatibility between the external charger and the vehicle before charging begins. Thus, charging troubles can be avoided in advance.

In addition, by transmitting the identification information on the external charger 2 based on the pre-charging process information to an external device, the VCU 20 of the vehicle 1 can identify the external charger even if the vehicle and the external charger cannot directly communicate with each other. Thus, more convenient information can be shared.

In particular, the VCU 20 of the vehicle 1 of the embodiment acquires the identification information on the external charger identified based on the behavior characteristics of a voltage value applied in the insulation test. Normally, for quick charging, the insulation test is performed as the pre-charging process, where the behavior of a voltage value varies with the external charger. Thus, by identifying the external charger based on the behavior characteristics of the voltage value, it is possible to easily identify the external charger without communications or the like with the external charger.

If the external charger 2 and the vehicle 1 connected to each other are incompatible with each other according to the acquired compatibility information, the VCU 20 of the vehicle 1 stops charging, whereby charging troubles can be avoided, and charging convenience of electric vehicles can be improved.

Charger Management Server

The charger management server 3 is a server for managing the information on the external charger 2, and is connected to the external network N. The charger management server 3 includes a server communication unit 30, a charger management database 31 (management storage unit), and a management control unit 40.

The server communication unit 30 is a communication device capable of wirelessly communicating with an external information network such as the Internet, a dedicated network, or the like. In the embodiment, the server communication unit 30 is connected with and is capable of interactively communicating with the vehicle 1 via the network N.

The charger management database 31 is an auxiliary memory device such as a hard disk, a solid state drive (SSD), or the like, and stores relevant information. The charger management database 31 of the embodiment stores relevant information such as the charging status information acquired from the vehicle 1 via the communication unit and the compatibility information generated in the management control unit 40 (more precisely, a compatibility information generation unit 42).

The management control unit 40 is a computer including: a central processing unit (CPU), a main memory device (a ROM, a RAM, etc.) for storing control programs, control maps, and the like; an input/output device; a timer counter; and the like, and controls the charger management server 3.

Specifically, the management control unit 40 includes an information acquisition unit 41 that acquires relevant information via the server communication unit 30, a compatibility information generation unit 42 that generates compatibility information on the compatibility between the external charger and the vehicle based on the acquired charging status information, and a distribution information generation unit 43 that generates distribution information for distributing the compatibility information to each vehicle.

The information acquisition unit 41 has a function of acquiring, via the server communication unit or from the charger management database 31, the charging status information on a status acquired when the external charger and the vehicle are connected to conduct charging. As described above, the charging status information is information including the vehicle information on the vehicle 1, the charger information on the external charger 2 connected with the vehicle 1, and the charging error information on charging errors caused between the external charger 2 and the vehicle 1. The charging error information is generated with charging errors, each made distinguishable according to the stage (charging process) at which it occurs. The stage includes the stage of the pre-charging process from when the external charger 2 is connected to when the driving battery of the vehicle 1 starts being charged; the subsequent stage during charging; and the stage at the completion of charging.

As the charger information, the information acquisition unit 41 acquires the identification information on the external charger 2 identified based on the pre-charging process conducted from when the external charger 2 is connected to when the driving battery of the vehicle starts being charged. Specifically, as described above, the pre-charging process is an insulation test in which a voltage is applied from the external charger 2 to the vehicle 1 to confirm an insulation status, and the identification information is information on the external charger 2 identified based on the behavior characteristics of a voltage value applied in the insulation test.

The compatibility information generation unit 42 analyzes the multiple pieces of charging status information stored in the charger management database 31, organizes the compatibility with each external charger according to the type of vehicle, and stores the compatibility in the charger management database 31. Specifically, as described above, being compatible or incompatible with each external charger is set according to the type of vehicle. Further, the compatibility information generation unit 42 may set levels of the compatibility or may set the conditions for compatibility according to, for example, the importance or urgency of charging errors. For example, for external chargers that have many pieces of charging error information with greater importance or urgency, such as lock mechanism errors and insulation errors, an alert may be issued or information urging a process for not allowing start of charging may be given at the time the vehicle has identified the external charger based on position information, image information, or the like before the connector is connected.

The distribution information generation unit 43 generates the distribution information by categorizing the latest charger information and compatibility information according to the type of vehicle, and transmits this distribution information to its respective vehicle sequentially or regularly.

Figure 5:
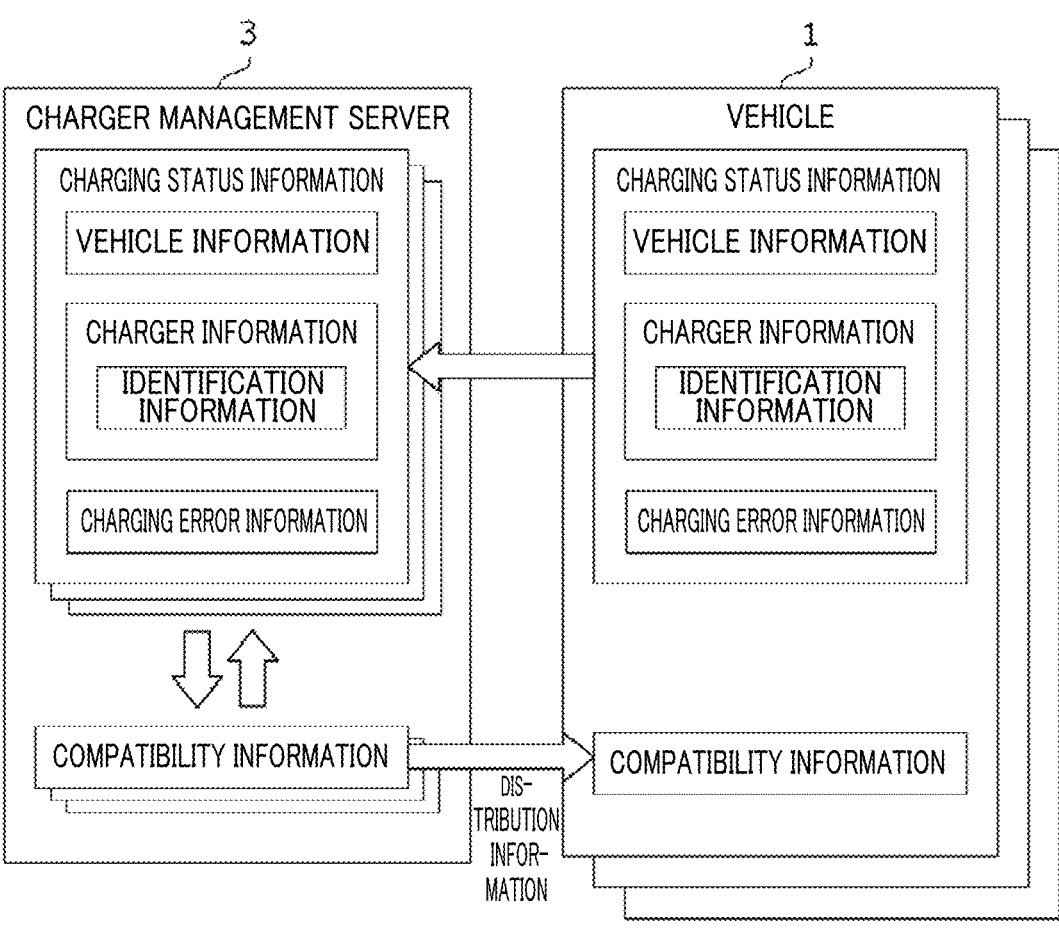
FIG. 5 is an explanatory diagram of the exchange of information between the charger management server and the vehicle.

FIG. 5 is an explanatory diagram of the exchange of information between the charger management server and the vehicle.

As shown in the figure, the charger management server 3 acquires the charging status information from multiple vehicles having the configuration of the vehicle 1, every time the external charger is connected. This charging status information includes the vehicle information, the charger information including the identification information, and the charging error information.

The charger management server 3 accumulates the acquired charging status information in the charger management database 31. The compatibility information generation unit 42 of the charger management server 3 generates the compatibility information based on the charging status information accumulated in the charger management database 31, and accumulates this compatibility information in the charger management database 31.

Then, the distribution information generation unit 43 generates the distribution information including the compatibility information and distributes this distribution information to each vehicle.

As described above, the charger management server 3 of the charging management system according to the embodiment acquires the charging error information in addition to the information on the vehicle 1 and the external charger 2 as the charging status information acquired when the external charger 2 is connected to the vehicle 1 to conduct charging. Then, based on such charging status information, the compatibility information between the external charger 2 and the vehicle 1 is generated and stored in the charger management database 31, thereby creating a database. By constructing such a database, it is possible to find an external charger that may cause charging troubles, considering the compatibility issue between the vehicle and the external charger as well. Accordingly, charging troubles can be avoided, and charging convenience of electric vehicles can be improved.

In addition, by acquiring as the charging error information the charging errors caused in the pre-charging process and creating a database, the charger management server 3 can find incompatibility between the external charger and the vehicle before charging begins. Thus, charging troubles can be avoided in advance.

In addition, by acquiring the identification information on the external charger based on the pre-charging process information and creating a database, the charger management server 3 can identify the external charger even if the vehicle and the external charger cannot directly communicate with each other. Thus, more convenient database can be constructed.

In particular, the charger management server 3 of the embodiment acquires the identification information on the external charger identified based on the behavior characteristics of a voltage value applied in the insulation test. Normally, for quick charging, the insulation test is performed as the pre-charging process, where the behavior of a voltage value varies with the external charger. Thus, by identifying the external charger based on the behavior characteristics of the voltage value, it is possible to easily identify the external charger without communications or the like with the external charger.

The charger management server 3 distributes the compatibility information to each vehicle, whereby charging troubles for each vehicle can be avoided, and charging convenience of electric vehicles can be improved.

The detailed description of the embodiment of the present disclosure is now ended, but the aspect of the present disclosure is not limited to the above embodiment.

For example, in the above embodiment, the VCU 20 of the vehicle 1 includes functions of the charger identification unit 21, the error detection unit 22, the charging status information generation unit 23, and the charging control unit 24, but is not limited to this configuration. Part or all of the functions may be provided in the external charger.

In the above embodiment, being compatible or incompatible with each external charger is set according to the type of vehicle, but the compatibility is not necessarily set according to the type of vehicle. In addition to the type of vehicle, the compatibility with each external charger may be set according to, for example, the date of manufacture or the type of in-vehicle device, such as a motor, an inverter, a driving battery, and an in-vehicle charging switch mounted in a vehicle.

In the above embodiment, the importance or urgency of the charging error is set to only two levels, "normal" and "high," but may be set to more levels. For example, charging errors with the importance or urgency ranked "lower" than normal may be set. Accordingly, for external chargers that cause charging errors with lower importance or urgency, responses different from those to charging errors ranked at different levels can be taken when the vehicle and the external charger are connected. Examples of the responses include only issuing an alert without stopping a charge when the vehicle and the external charger are connected.

In the above embodiment, the control by the charging control unit 24 for allowing or not allowing start of charging is performed by ON/OFF control of the relay of the in-vehicle charging switch 14, but as long as the charging of the driving battery can be controlled, the control may be performed by, for example, ON/OFF control of the relay of the junction box.

In the above embodiment, the vehicle 1 is an electric vehicle, but the present disclosure may adopt any vehicle of which a driving battery can be charged by an external charger, and may adopt, for example, a hybrid electric vehicle.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

DESCRIPTION OF REFERENCE CHARACTERS

1 Vehicle
2 External Charger
2*a* Connector
3 Charger Management Server (Charger Management Device)
13 Driving Battery
14 In-Vehicle Charging Switch
15 Charging Inlet
16 Vehicle Memory Unit
17 Vehicle Communication Unit
20 Vehicle Control Unit (VCU)
21 Charger Identification Unit
22 Error Detection Unit
23 Charging Status Information Generation Unit
24 Charging Control Unit
30 Server Communication Unit
31 Charger Management Database
40 Management Control Unit
41 Information Acquisition Unit
42 Compatibility Information Generation Unit
43 Distribution Information Generation Unit

The invention claimed is:

1. A charger management device for managing compatibility between an external charger and a vehicle, the charger management device comprising:

an information acquisition unit configured to acquire charging status information on a status acquired when the external charger and the vehicle are connected to conduct charging;

a compatibility information generation unit configured to generate compatibility information on compatibility between the external charger and the vehicle based on the charging status information; and a management storage unit configured to store the charging status information and the compatibility information, wherein as the charging status information, the information acquisition unit acquires vehicle information on the vehicle, charger information on the external charger connected with the vehicle, and charging error information on a charging error caused between the external charger and the vehicle during a charging process of a driving battery of the vehicle by the external charger, the charging process delivers power from the external charger to the driving battery of the vehicle, and the charging process occurs subsequent to a pre-charging process, the compatibility information includes incompatibility information on incompatibility between a vehicle and an external charger between which a charging error has occurred, the incompatibility information includes a charging error that has occurred between the vehicle and the external charger that are compliant with a same charging standard, and the management storage unit stores the compatibility information so that incompatibility between the vehicle and the external charger that are connected is identifiable before charging begins.

2. The charger management device of claim 1, wherein the information acquisition unit generates the charging error information on charging errors, each made so distinguishable that the charging errors include at least a charging error caused in the pre-charging process conducted from when the external charger is connected to the driving battery of the vehicle until the driving battery of the vehicle starts being charged with the power and a charging error caused after the driving battery of the vehicle starts being charged with the power.

3. The charger management device of claim 1, wherein as the charger information, the information acquisition unit acquires at least identification information on the external charger identified based on the pre-charging process conducted from when the external charger is connected to when a driving battery of the vehicle starts being charged.

4. The charger management device of claim 3, wherein the pre-charging process includes an insulation test in which a voltage is applied from the external charger to the vehicle to confirm an insulation status, and the identification information is information on the external charger identified based on behavior characteristics of a voltage value applied in the insulation test.

5. The charger management device of claim 1, further comprising:

a distribution information generation unit configured to generate distribution information including the compatibility information and distribute the distribution information to each vehicle.

6. A charging control device for controlling charge from an external charger to a driving battery of a vehicle, the charging control device comprising:

a charging error detection unit configured to detect a charging error caused between the external charger and the vehicle connected to each other during a charging process of the driving battery of the vehicle by the external charger, wherein the charging process delivers power from the external charger to the driving battery of the vehicle, and the charging process occurs subsequent to a pre-charging process;

a charging status information generation unit configured to generate charging status information on a status acquired when the external charger and the vehicle are connected to conduct charging; and a communication unit configured to transmit the charging status information to an external device via a network, wherein as the charging status information, the charging status information generation unit generates information including vehicle information on the vehicle, charger information on the external charger connected with the vehicle, and charging error information on the charging error detected by the charging error detection unit, the communication unit acquires from an external device compatibility information that is generated based on the charging status information and that relates to compatibility between the external charger and the vehicle, and the charging control device includes a charging control unit configured to stop charging if the external charger and the vehicle connected to each other are incompatible with each other according to the compatibility information, the compatibility information includes incompatibility information on incompatibility between a vehicle and an external charger between which a charging error has occurred, the incompatibility information includes a charging error that has occurred between the vehicle and the external charger that are compliant with a same charging standard, and management storage unit stores the compatibility information so that incompatibility between the vehicle and the external charger that are connected is identifiable before charging begins.

7. The charging control device of claim 6, wherein the charging error detection unit is configured to detect one or more distinguishable charging errors, wherein the one or more distinguishable charging errors include a charging error caused in the pre-charging process conducted from when the external charger is connected to the driving battery until the driving battery of the vehicle starts being charged with the power and a charging error caused after the driving battery of the vehicle starts being charged with the power.

8. The charging control device of claim 6, further comprising:

a charger identification unit configured to identify the external charger based on the pre-charging process conducted from when the external charger is connected to when the driving battery starts being charged, wherein as the charger information, the charging status information generation unit generates the charging status information including identification information of the external charger identified by the charger identification unit.

9. The charging control device of claim 8, wherein the pre-charging process is an insulation test in which a voltage is applied from the external charger to the vehicle to confirm an insulation status, and the charger identification unit identifies the external charger based on behavior characteristics of a voltage value applied in the insulation test.

10. A charging control device for controlling charge from an external charger to a driving battery of a vehicle, the charging control device comprising:

a charging error detection unit configured to detect a charging error caused between the external charger and the vehicle connected to each other;

a charging status information generation unit configured to generate charging status information on a status acquired when the external charger and the vehicle are connected to conduct charging during a charging process of the driving battery of the vehicle by the external charger, wherein the charging process delivers power from the external charger to the driving battery of the vehicle, and the charging process occurs subsequent to a pre-charging process; and a vehicle memory unit configured to store the charging status information, wherein as the charging status information, the charging status information generation unit generates information including vehicle information on the vehicle, charger information on the external charger connected with the vehicle, and charging error information on an error detected by the charging error detection unit, the vehicle memory unit stores compatibility information that is generated based on the charging status information and that relates to compatibility between the external charger and the vehicle, and the charging control device includes a charging control unit configured to stop charging if the external charger and the vehicle connected to each other are incompatible with each other according to the compatibility information, the compatibility information includes incompatibility information on incompatibility between a vehicle and an external charger between which a charging error has occurred, the incompatibility information includes a charging error that has occurred between the vehicle and the external charger that are compliant with a same charging standard, and the management storage unit stores the compatibility information so that incompatibility between the vehicle and the external charger that are connected is identifiable before charging begins.

* * * * *